(12) United States Patent
Sengupta

(10) Patent No.: US 8,458,004 B2
(45) Date of Patent: Jun. 4, 2013

(54) DYNAMICALLY POOLING UNUSED CAPACITIES ACROSS AN ORGANIZATION TO EXECUTE ATOMIC TASKS

(75) Inventor: Bikram Sengupta, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 385 days.

(21) Appl. No.: 12/758,248

(22) Filed: Apr. 12, 2010

(65) Prior Publication Data

US 2011/0251866 A1 Oct. 13, 2011

(51) Int. Cl.
 *G06Q 10/00* (2006.01)
(52) U.S. Cl.
 USPC .................. 705/7.21; 705/7.12; 705/7.26
(58) Field of Classification Search
 USPC .............. 705/7.12, 7.21, 7.26, 7.27
 See application file for complete search history.

(56) References Cited

U.S. PATENT DOCUMENTS

| | | | |
|---|---|---|---|
| 7,386,850 B2 | 6/2008 | Mullen | |
| 2004/0243457 A1* | 12/2004 | D'Andrea et al. | 705/9 |
| 2005/0004825 A1 | 1/2005 | Ehrler et al. | |
| 2005/0154625 A1* | 7/2005 | Chua et al. | 705/7 |
| 2006/0095311 A1 | 5/2006 | Thompson | |
| 2006/0259443 A1* | 11/2006 | Vincenzini et al. | 705/400 |
| 2007/0061179 A1 | 3/2007 | Henderson et al. | |
| 2007/0106545 A1* | 5/2007 | Jowers et al. | 705/8 |
| 2009/0063238 A1* | 3/2009 | Storzum et al. | 705/9 |
| 2009/0265299 A1* | 10/2009 | Hadad et al. | 706/55 |
| 2009/0327403 A1* | 12/2009 | Bhat et al. | 709/203 |

OTHER PUBLICATIONS

King, Zella, "Human Resource Management, Dynamic Capability and the Micro-Foundations of Value-Creating Collaboration", First Draft, paper to be presented at Centre for Strategic Management and Globalisation's mini-conference on HRM and Knowledge Related Performance, available at url?sa=t&source=web&ct=res&cd=1&ved=0CAcQFjAA&url=http%3A%2F%2Fuk.cbs.dk%2Fcontent%2Fdownload%2F48783%2F703509%2Ffile%2FKing.pdf&ei=yCEiS7r8KY6A7QOo3NC0Bg&usg=AFQjCNGJOC0TIMMYlwR-8Za8e0PK6lAYLQ&sig2=i51dJf-0KOpuOaqSlmP2XA as of Dec. 17, 2009.
Jackson, Susan E., and Schuler, Randall S., "Human Resource Planning, Challenges for Industrial/Organizational Psychologists", Feb. 1990, American Psychologist, pp. 223-239.

\* cited by examiner

*Primary Examiner* — Andre Boyce
*Assistant Examiner* — William Brockington, III
(74) *Attorney, Agent, or Firm* — Ference & Associates LLC

(57) ABSTRACT

In the context of a work container which includes a set of atomic tasks to be executed in some order, along with a specification of the role/skill needed for each task, the estimated effort and due date, methods and arrangements for pooling unutilized capacities of multiple resources whenever possible, and making adjustments to the estimated effort to take transactional costs into account. More particularly, preferred embodiments of the invention operate on a principle that if resources do not individually have the available bandwidth needed to execute and complete an atomic task during a given period then, collectively, the time available on their calendars, when pooled together and aggregated in sequence, may well be more than sufficient for the task, even after making adjustments to account for transaction costs.

17 Claims, 3 Drawing Sheets

DYNAMICALLY POOLING UNUSED CAPACITIES ACROSS AN ORGANIZATION TO EXECUTE ATOMIC TASKS

BACKGROUND

Many service organizations define and manage work using the concept of a "work container". Generally, a work container is considered to include a set of atomic tasks to be executed in some order, along with a specification of the role/skill needed for each task, the estimated effort and due date. As the name suggests, an "atomic task" is generally understood to be a task that is difficult to statically partition further (at the work container specification level), and which should ideally be assigned to a single resource. Atomicity does not necessarily derive from the granularity of the task, but may also be related to the fact that the task may not be easily parallelizable (i.e., performed in parallel) and may require a certain context/understanding to be preserved throughout its duration.

Generally, in conventional arrangements, a planning engine will act to attempt to assign each atomic task to a resource, and will impart a schedule to the by way of developing an overall plan. When resource utilization is very high, the planner may well encounter situations where resources with the right skill/role might exist for a given task, but the individual available effort from each resource is not sufficient for the task to be completed by the due date. In such cases, a common practice is to try and schedule the task for the earliest possible finish, by assigning it to the resource who can complete it earlier than others, even if this goes past the due date. However, in many settings, such a slippage in the schedule will invite a penalty to the organization. Alternatively, the organization may end up rejecting a work container when some of the atomic tasks cannot be scheduled on time, and of course this is often not a desirable outcome as it can lead to a loss of revenue.

BRIEF SUMMARY

Broadly contemplated herein, in accordance with at least one presently preferred embodiment of the present invention, is the pooling of unutilized capacities of multiple resources whenever possible, and making adjustments to the estimated effort to take transactional costs into account. More particularly, preferred embodiments of the invention operate on a principle that if resources do not individually have the available bandwidth needed to execute and complete an atomic task during a given period then, collectively, the time available on their calendars, when pooled together and aggregated in sequence, may well be more than sufficient for the task, even after making adjustments to account for transaction costs.

In summary, one aspect of the invention provides a method comprising: assimilating an atomic task for execution; inputting constraints on performing the atomic task; assessing available capacities among a pool of resources; assimilating historical information on execution of atomic tasks; determining an adjustment factor based on the assimilated historical information; generating a plan for the assimilated atomic task, the generating comprising: assimilating the input constraints, the assessed available capacities of the pool of resources and the adjustment factor; and outputting the plan, the output plan including an assignment of the task to one or more resources.

Another aspect of the invention provides an apparatus comprising: one or more processors; and a computer readable storage medium having computer readable program code embodied therewith and executable by the one or more processors, the computer readable program code comprising: computer readable program code configured to assimilate an atomic task for execution; computer readable program code configured to input constraints on performing the atomic task; computer readable program code configured to assess available capacities among a pool of resources; computer readable program code configured to assimilate historical information on execution of atomic tasks; computer readable program code configured to determine an adjustment factor based on the assimilated historical information; computer readable program code configured to generate a plan for the assimilated atomic task via: assimilating the input constraints, the assessed available capacities of the pool of resources and the adjustment factor; and outputting the plan, the output plan including an assignment of the task to one or more resources.

A further aspect of the invention provides a computer program product comprising: a computer readable storage medium having computer readable program code embodied therewith, the computer readable program code comprising: computer readable program code configured to assimilate an atomic task for execution; computer readable program code configured to input constraints on performing the atomic task; computer readable program code configured to assess available capacities among a pool of resources; computer readable program code configured to assimilate historical information on execution of atomic tasks; computer readable program code configured to determine an adjustment factor based on the assimilated historical information; computer readable program code configured to generate a plan for the assimilated atomic task via: assimilating the input constraints, the assessed available capacities of the pool of resources and the adjustment factor; and outputting the plan, the output plan including an assignment of the task to one or more resources.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
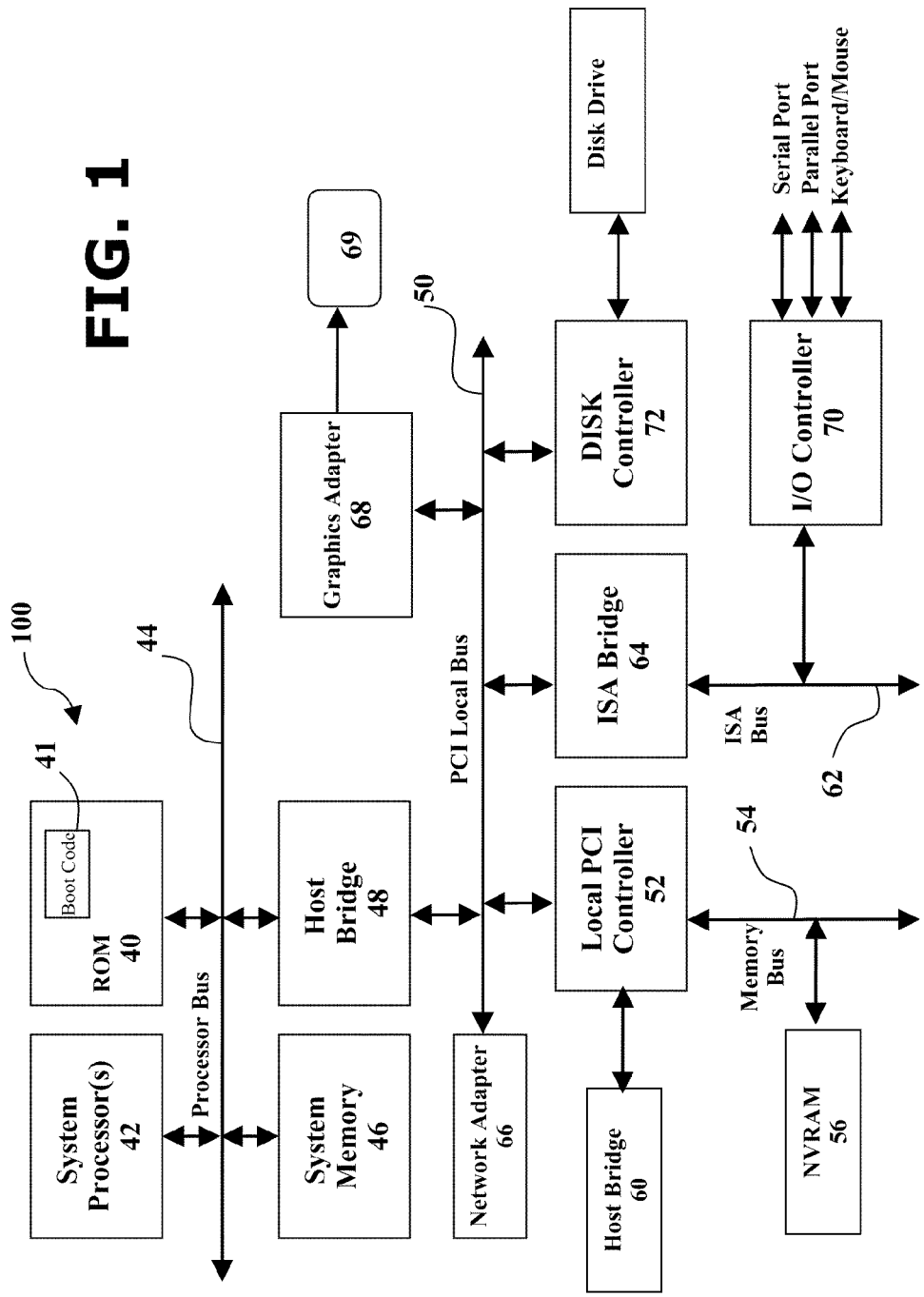
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is depicted a block diagram of an illustrative embodiment of a computer system 100. The illustrative embodiment depicted in FIG. 1 may be an electronic device such as a laptop or desktop personal computer, a mobile/smart phone or the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

In accordance with at least one presently preferred embodiment of the present invention, there is broadly contemplated herein a planning system, which when faced with a situation where an atomic task cannot be completed by any one resource by a given due date, dynamically generates plans for a team of resources having similar roles/skills to collaborate on such tasks, and specify the order in which each resource should spend his/her available efforts, all of which when aggregated is sufficient for the task to be complete.

Also, given that the task is considered atomic and under optimal circumstances normally undertaken by a single person, transaction costs may well arise because of the switch in context, as multiple people get involved in the task in sequence. Accordingly, the planning engine, in accordance with a preferred embodiment, accounts for this by increasing the estimated effort for the task by multiplying the time estimate by a transaction cost factor, which can be a function of the number of people who have to be brought in to complete the task.

In accordance with at least one preferred embodiment, the planning engine tries to minimize the number of people needed for the task by considering the maximal effort each resource is able to commit, and by allowing a resource to return to the task if he/she cannot be available during the entire allocated time slot. In other words, if a resource spends some time on the task before having to stop and hand over the task to another resource, the planning engine allows for the possibility of the former resource to come back later when he/she again has some free time on his/her calendar, to contribute to the task again. In a preferred embodiment, such a "returning" resource is given preference over a "new" resource, since the returning resource is clearly more likely to have assimilated some information and context regarding the task.

In a preferred embodiment, the transaction cost also reflects the possibility that certain resources are able to collaborate more efficiently than others. The planning system computes such a factor of the transaction cost by learning from previous experiences where such transactions have been planned and executed, and previous engagements where the resources have collaborated.

Finally, the total effort spent by each resource on the atomic task is used in a preferred embodiment as one input to assign proportional credit and/or rewards.

Figure 2:
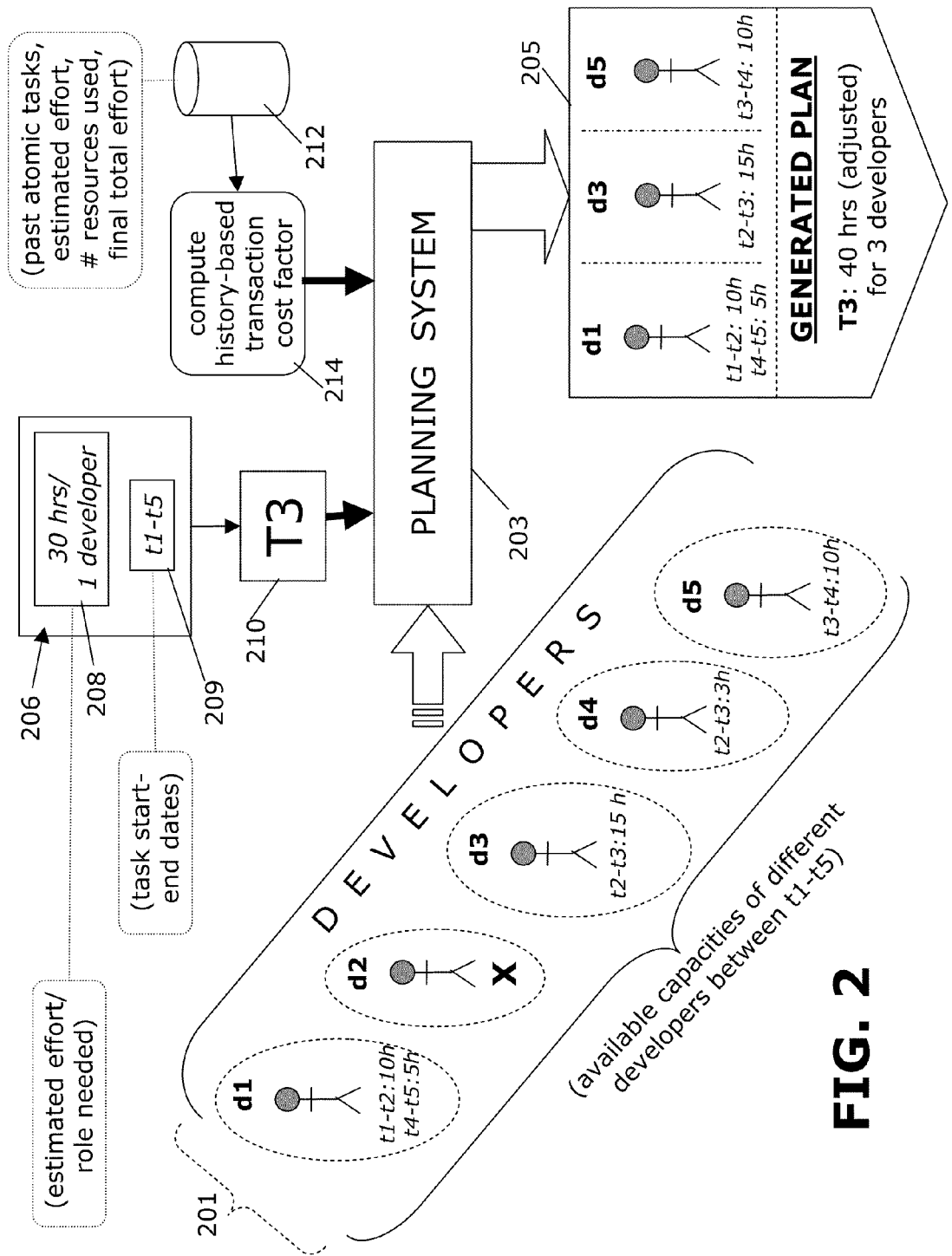
FIG. 2 schematically illustrates elements of a process for scheduling and assigning atomic tasks to resources.

FIG. 2 schematically illustrates, in accordance with a preferred embodiment of the present invention, a process for scheduling and assigning atomic tasks to resources. It should be appreciated that a process such as that broadly illustrated in FIG. 2 can be carried out on essentially any suitable computer system or set of computer systems, which may, by way of an illustrative and on-restrictive example, include a system such as that indicated at 100 in FIG. 1. In accordance with an example embodiment, most if not all of the process steps discussed with respect to FIG. 2 can be performed by way of system processors and system memory such as those indicated, respectively, at 42 and 46 in FIG. 1.

Generally, in a preferred embodiment of the invention, a pool of developers 201 will avail themselves to a planning system or engine 203, which based on other inputs will generate a plan 205 to assign one or more of the developers to an atomic task. To start, each of the developers 201 will be available for a given task T3 (at 210), and each (marked d1 . . . d5) will have different available capacities for predetermined time periods (here marked as t1 . . . t5). Thus, as shown, d1 is available for 10 hours combined over the periods t1 and t2, and over the periods of t4 and t5 for 5 hours combined. Developer d2, on the other hand, is completely unavailable during the time periods and thus here is marked with an "X". Developer d3 is available for 15 hours in each of time periods t2 and t3, and so on.

In a preferred embodiment, the task T3 (at 210) will be defined by input information 206 that has been previously entered or recorded. The input information 206, in an embodiment, can include an estimate 208 of the effort or roles needed to complete the task (e.g., 30 hours for one developer), as well as start/end dates 209 of the task (in the present example, t1 . . . t5, where each of t1 . . . t5 could be a predefined unit of time, e.g., a day or a week, etc.). In a preferred embodiment, a historical database 212 also serves as input into the planning system/engine 203. In the present example, database 212 includes information on past atomic tasks, including the (original) estimated effort for each task, the number of resources used and the final (measured) total effort. This information is used to determine (214) a history-based transaction cost factor, as discussed heretofore.

In a preferred embodiment, the generated plan 205 will indicate how many, and which, developer(s) are to be assigned to the atomic task, and over which time period(s) each developer will be slated to work. Here, in a non-restrictive and illustrative example, developer d1 is assigned to work 10 hours combined over t1 and t2 and 5 hours combined over t4 and t. Developer d2, on the other hand, is assigned to 15 hours over t2 and t3, while developer d3 is assigned to 10 hours over t3 and t4. The plan here also indicates that up to 40 hours may be budgeted between the three developers; this 40 hour figure, in the present example, has been derived on the basis of the history-based transaction cost factor (as discussed heretofore).

It should be pointed out that, to the extent that hours initially associated with each developer represent their available hours; in the event that a task ends early and a developer does not traverse all of the hours that end up being budgeted to him/her for the task, then of course at least a portion of his/her remaining time could be availed to other tasks.

It will be appreciated that the planning system 203, in the present illustrative example, has acted to determine an optimal "matrix of availability" among developers, to the extent that no single developer d1 . . . d5 is able to perform the atomic task T3 (210) alone. Thus, in the absence of an ideal scenario of one developer for one atomic task, at least by way of the action of planning system 203 a set or matrix of developers (as shown in the plan 205) has been identified as being available for the task, where a transaction cost factor as determined at 214 (here, a multiplier of about 1.333) modifies the originally benefited 30 hours. The 40 hours may in fact be considered to be a maximum, since the transaction cost factor (at 214), in accordance with a preferred embodiment, will have assumed a total of three developers while, if there are only two developers who end up working on the task, the total needed time may well be reduced.

It should also be noted that, in the present example, developer d1 is assigned to two distinct time periods, namely, one comprising t1 and t2 and the other comprising t4 and t5. In a preferred embodiment, the planning system 203 and the transaction cost factor (from 214) take into account the possibility of one developer working in two different but non-contiguous time slots for the atomic task; as can be appreciated, this would abbreviate the needed learning curve normally required when one developer hands over a task to another, and in a preferred embodiment the transaction cost factor reflects this.

It should be appreciated that, in accordance with at least one embodiment of the present invention, a plan generation approach (in embodiments of the invention, a scheduling algorithm) will be driven by a set of constraints. One of the constraints would be to minimize the number of resources who are assigned to a single task. Accordingly, in an example embodiment, the planning system will first try to find a single resource who can perform the task, i.e., is available for the estimated time during the period of interest. In case such a resource cannot be found, the planning system will try to find the smallest number of resources who can work in sequence to complete the task, and for any such combination of resources, will adjust the estimated effort by a transaction cost factor that depends on the number of resources it is trying to assign the task to. There may be additional constraints as well, for example, another constraint may be to complete the task by the earliest possible date.

In accordance with at least one preferred embodiment of the invention, computation of the transaction cost factor for a given selection of resources for a task is based on analysis of historical data of similar completed tasks. By way of an example, such an analysis could consider the original estimate for a previously performed task (e.g., "O", given in anticipation of the task being performed by a single resource), the number of resources (e.g., "N") who were eventually involved in that task, and the actual total effort (e.g., "E") that was expended across all resources, with the ratio of the total effort to the original estimate (E/O) providing the transactional cost factor that was incurred for the task because of its assignment to N resources. For each type of task, a set of historical data points can be collected to study how the transaction cost factor varies with the number of resources, using statistical analysis techniques e.g. regression analysis.

An approach such as that described immediately above, of course, can easily be extended to cover other transaction cost factor determinants. For example, transaction costs for a task may also depend on the level of familiarity amongst the resources; to this end, a familiarity score may be assigned to the resource set for a task (and this may be computed based on their collaboration history), where the intuition is that transaction costs will be less when the set of resources for the task have had a successful collaboration experience in the past, than when the resources have had little or no history of collaboration.

Figure 3:
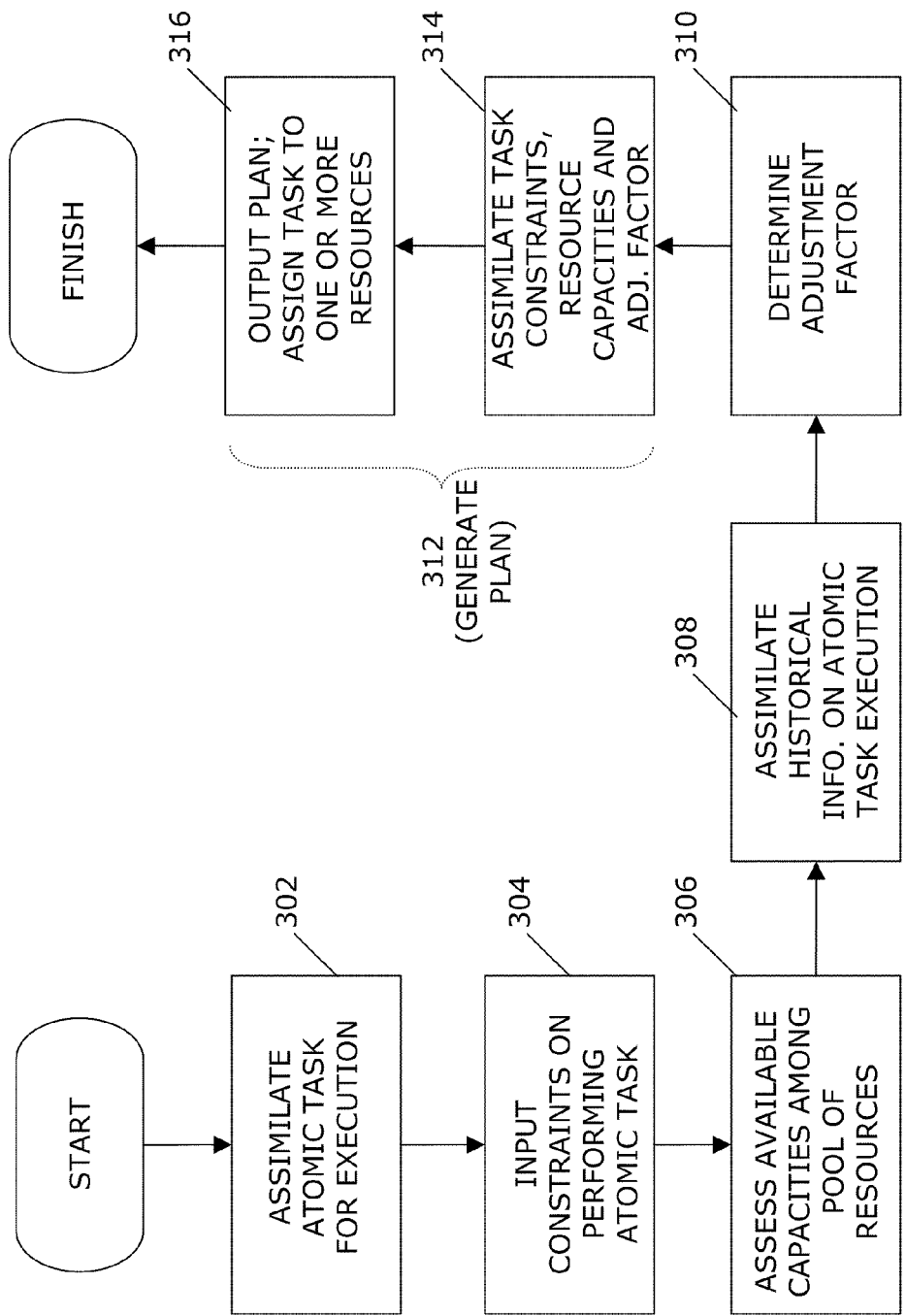
FIG. 3 sets forth a process more generally for scheduling and assigning atomic tasks to resources.

FIG. 3 more generally sets forth a process for scheduling and assigning atomic tasks to resources, in accordance with at least one preferred embodiment of the present invention. It should be appreciated that a process such as that broadly illustrated in FIG. 3 can be carried out on essentially any suitable computer system or set of computer systems, which may, by way of an illustrative and on-restrictive example, include a system such as that indicated at 100 in FIG. 1. In accordance with an example embodiment, most if not all of the process steps discussed with respect to FIG. 3 can be performed by way of system processors and system memory such as those indicated, respectively, at 42 and 46 in FIG. 1.

As shown in FIG. 3, an atomic task is first assimilated for execution (302). Next, constraints on performing the atomic task are input (304) and available capacities among a pool of resources are assessed (306). Historical information on the execution of atomic tasks is then assimilated (308) and an adjustment factor is determined based on the assimilated historical information (310). Thence, a plan is generated with regard to the assimilated atomic task (312) via at least the following steps: assimilating the input constraints, the assessed available capacities of the pool of resources and the adjustment factor (314); and outputting the plan, wherein the output plan includes an assignment of the task to one or more resources (316).

In brief recapitulation, it will be appreciated that embodiments of the invention permit, advantageously, the pooling of unused capacities of multiple resources to create flexible execution plans with adjustable effort boundaries for atomic tasks. While nominally atomic tasks are associated with employing a single resource, embodiments of the invention permit multiple individuals to collaborate on a task at execution time, while making adjustments to estimated effort to account for collaboration/transaction costs. As a result of employing a planning engine in accordance with embodiments of the invention, it is possible to complete more tasks on time and avoid penalties, which can lead to being able to accept more tasks and increase revenue, reduce the idle time of resources and promote more collaboration across team members to thereby improve future organizational performance.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A computer implemented method comprising:
utilizing a processor to execute computer code configured to perform the steps of:
receiving input for a task comprising two or more atomic tasks;
assimilating an atomic task for execution;
inputting constraints on performing the task;
wherein the input constraints comprise an initial time-based estimate for completion of the task;
wherein the initial time-based estimate for completion of the task relates to hypothetical execution of the task by a single resource;
assessing available capacities among a pool of resources;
assimilating historical information on execution of atomic tasks;
determining an adjustment factor based on the assimilated historical information;
wherein said determining of an adjustment factor comprises determining a multiplier;
wherein said determining of a multiplier comprises determining a multiplier as a function of a prospective resource to be assigned to each atomic task for two non-contiguous time periods; and
generating a plan for the assimilated atomic task, said generating comprising:
assimilating the input constraints, the assessed available capacities of the pool of resources and the adjustment factor;
assigning the task to two or more resources;
determining an aggregated time-based target for completion of the task, the aggregated time-based target comprising individual time-based targets for completion for each of the two or more resources;
wherein said determining of an aggregated time-based target comprises modifying the initial time-based estimate for completion of the task with the multiplier; and
outputting the plan.

2. The method according to claim 1, wherein said assignment of the task to two or more resources comprises an assignment to a single resource of two non-contiguous time periods associated with the task and an assignment to another single resource a time period interposed between the two non-contiguous time periods.

3. The method according to claim 1, wherein said generating is performed automatically.

4. The method according to claim 1, wherein the input constraints comprise a time-based constraint for performing the task.

5. The method according to claim 1, wherein said determining of a multiplier comprises determining a multiplier as a function of a prospective number of resources to be associated to the task.

6. The method according to claim 1, wherein said assimilating of historical information comprises assimilating information on actual times of completion for past atomic tasks.

7. The method according to claim 6, wherein said assimilating of historical information comprises assimilating comparative information on initial time-based estimates for completion and actual times of completion for past atomic tasks.

8. The method according to claim 1, wherein said assimilating of historical information comprises assimilating information selected from the group consisting of: the number of resources used in executing past tasks; initial time-based estimates for completion applied to past atomic tasks; past collaboration between two or more specific individual resources.

9. The method according to claim 1, wherein said generating is performed subsequent to a determination that no single resource is available to execute and complete individually the entire task.

10. The method according to claim 1, wherein said generating comprises determining a minimum number of resources required to execute and complete the task.

11. An apparatus comprising:
one or more processors; and
a non-transitory computer readable storage medium having computer readable program code embodied therewith an executable by the one or more processors, the computer readable program code comprising:
computer readable program code configured to receive input for a task comprising two or more atomic tasks;
computer readable program code configured to assimilate an atomic task for execution;
computer readable program code configured to input constraints on performing the task;
wherein the input constraints comprise an initial time-based estimate for completion of the task;
wherein the initial time-based estimate for completion of the task relates to hypothetical execution of the task by a single resource;
computer readable program code configured to assess available capacities among a pool of resources;
computer readable program code configured to assimilate historical information on execution of atomic tasks;
computer readable program code configured to determine an adjustment factor based on the assimilated historical information;
wherein said computer readable program code is configured to determine an adjustment factor as a multiplier;
wherein said computer readable program code is configured to determine a multiplier as a function of a prospective resource to be assigned to each atomic task for two non-contiguous time periods; and
computer readable program code configured to generate a plan for the assimilated atomic task via:
assimilating the input constraints, the assessed available capacities of the pool of resources and the adjustment factor;
assigning the task to two or more resources;
determining an aggregated time-based target for completion of the task, the aggregated time-based target comprising individual time-based targets for completion for each of the two or more resources;
wherein said determining of an aggregated time-based target comprises modifying the initial time-based estimate for completion of the task with the multiplier; and
outputting the plan.

12. A computer program product comprising:
a non-transitory computer readable storage medium having computer readable program code embodied therewith, the computer readable program code comprising:
computer readable program code configured to receive input for a task comprising two or more atomic tasks;

computer readable program code configured to assimilate an atomic task for execution;

computer readable program code configured to input constraints on performing the task;

wherein the input constraints comprise an initial time-based estimate for completion of the task;

wherein the initial time-based estimate for completion of the task relates to hypothetical execution of the task by a single resource;

computer readable program code configured to assess available capacities among a pool of resources;

computer readable program code configured to assimilate historical information on execution of atomic tasks;

computer readable program code configured to determine an adjustment factor based on the assimilated historical information;

wherein said computer readable program code is configured to determine an adjustment factor as a multiplier;

wherein said computer readable program code is configured to determine a multiplier as a function of a prospective resource to be assigned to each atomic task for two non-contiguous time periods; and computer readable program code configured to generate a plan for the assimilated atomic task via:
 assimilating the input constraints, the assessed available capacities of the pool of resources and the adjustment factor;
 assigning the task to two or more resources;
 determining an aggregated time-based target for completion of the task, the aggregated time-based target comprising individual time-based targets for completion for each of the two or more resources;
 wherein said determining of an aggregated time-based target comprises modifying the initial time-based estimate for completion of the task with the multiplier; and
 outputting the plan.

13. The computer program product according to claim 12, wherein said assignment of the task to two or more resources comprises an assignment to a single resource of two non-contiguous time periods associated with the task and an assignment to another single resource a time period interposed between the two non-contiguous time periods.

14. The computer program product according to claim 12, wherein the input constraints comprise a time-based constraint for performing the task.

15. The computer program product according to claim 12, wherein said computer readable program code is configured to determine a multiplier as a function of a prospective number of resources to be associated to the task.

16. The computer program product according to claim 12, wherein said computer readable program code is configured to assimilate information selected from the group consisting of: actual times of completion for past atomic tasks; the number of resources used in executing past tasks; initial time-based estimates for completion applied to past atomic tasks; past collaboration between two or more specific individual resources.

17. The computer program product according to claim 12, wherein said computer readable program code is configured to determine a minimum number of resources required to execute and complete the task.

* * * * *